(12) United States Patent
Miyake

(10) Patent No.: US 6,591,962 B2
(45) Date of Patent: Jul. 15, 2003

(54) TRANSPORTING APPARATUS FOR PLATE FORM BODY

(75) Inventor: Atsuo Miyake, Osaka (JP)

(73) Assignee: Daifuku Co. Ltd. (JP)

( * ) Notice: Subject to any disclaimer, the term of this patent is extended or adjusted under 35 U.S.C. 154(b) by 0 days.

(21) Appl. No.: 10/055,465

(22) Filed: Jan. 22, 2002

(65) Prior Publication Data

US 2002/0121424 A1 Sep. 5, 2002

(30) Foreign Application Priority Data

Mar. 2, 2001 (JP) .................................... 2001-057900

(51) Int. Cl.[7] ................................................ B65G 1/10
(52) U.S. Cl. ............................... 198/347.1; 198/347.3; 414/331.14
(58) Field of Search .......................... 198/347.1–347.4, 198/809, 782; 414/331.14–331.17

(56) References Cited

U.S. PATENT DOCUMENTS

| 4,499,987 A | * | 2/1985 | Long | 198/347.3 |
| 5,255,773 A | * | 10/1993 | Pollock | 198/347.3 |
| 5,501,564 A | * | 3/1996 | Doche | 414/331.13 |
| 5,529,165 A | * | 6/1996 | Shupert | 198/347.3 |

FOREIGN PATENT DOCUMENTS

| JP | 2001253541 A | * | 9/2001 | ........... B65G/61/00 |

* cited by examiner

Primary Examiner—Christopher P. Ellis
Assistant Examiner—Mark A. Deuble
(74) Attorney, Agent, or Firm—Schweitzer Cornman Gross & Bondell LLP

(57) ABSTRACT

A transporting apparatus has two storage means with plate form body supporting members in a plurality of stages in vertical direction. Each plate form body supporting member is constructed with a plurality of string like members having widths to pass through clearance between adjacent transporting rotary bodies for vertical movement therethrough and arranged on the same plane for simply being lifted up and down for loading and unloading the plate form body. The storage mean scan be arranged within an installation region of the transporting passage portion. Also, necessary length of the transporting passage portion is merely two or three times of the plate form body. The storage means can be installed in a relay transporting passage portion arranged between two transporting lines arranged in parallel relationship to facilitate installation with simple and compact construction.

3 Claims, 7 Drawing Sheets

TRANSPORTING APPARATUS FOR PLATE FORM BODY

BACKGROUND OF THE INVENTION

1. Field of the Invention

The present invention relates to a transporting apparatus for plate form bodies to be used by building in a processing line or an inspection line of a glass panel for a plasma display, for example.

2. Description of the Related Art

It is typical that a processing line or an inspection line of glass plates for plasma displays is divided into kinds of processes or inspection, or that a processing line or an inspection line cannot be constructed as a single straight line due to physical restriction. In such case, a relaying transporting passage portion is arranged for connection between the divided lines. When it becomes necessary to stop transportation of the plate form body in the line located downstream side of the relaying transporting passage portion, the plate form bodies fed from the upstream side line have to be temporarily stored without feeding into the downstream side line. Adapting to this, a storage apparatus for temporarily storing the plate form bodies is provided in the relaying transporting passage. In such case, the plate form bodies storage apparatus in the relaying transporting passage portion may be constructed to receive the plate form bodies fed from the upstream side line through a storage line branched from the relaying transporting passage portion, for temporary storage.

The construction, in which the storage apparatus is added, is disadvantageous for significant increase of facility investment and is even impractical in view point of installation space. Therefore, it is typical measure to build in the storage apparatus in the existing relaying transporting passage portion. In such kind of storage apparatus built in the relaying transporting passage portion, the plate form bodies on the relaying transporting passage portion are transported and vertically or laterally stacked. In the typically considered layout, the storage apparatus is arranged on upper side, lower side or lateral side of the relaying transporting passage portion, and transfer means for transferring the plate form bodies between the storage apparatus and the transporting passage is employed. However, such construction is also requires high facility investment for requiring dedicated transfer means and further requires large installation space for overall apparatus to cause significant difficulty in practical use by installing with the existing relaying transporting passage portion.

SUMMARY OF THE INVENTION

It is an object of the present invention to provide a transporting apparatus for plate form bodies which can solve the problems set forth above.

In order to accomplish the above-mentioned object, according to one aspect of the present invention, a transporting apparatus for plate form bodies, comprises:

a transporting passage portion arranged in a transporting line of plate form bodies and including transporting rotary bodies arranged in alignment along a transporting direction with a given interval;

temporarily storing means provided in the transporting passage portion at two positions of upstream side and downstream side for storing plate form bodies, each temporarily storing means including vertically arranged a plurality of plate form body supporting members with a given interval permitting the plate form body to pass through, each plate form body supporting member being formed with a plurality of string like members having lateral width to pass through a clearances between the transporting rotary bodies for movement in vertical direction and arranged in a transporting direction on the same plane for picking up the plate form body stopped at a predetermined position on the transporting passage portion and lifting the picked up plate form body for loading operation, and placing the plate form body in the storage portion onto the transporting passage portion for unloading operation.

With a carriage type transporting apparatus of the present invention constructed as set forth above, the storage means provided at two positions of upstream side and downstream side in the transporting direction are provided with plate form body supporting members in a plurality of stages in a vertical direction. Each plate form body supporting member is constructed with a plurality of string like members having widths to pass through clearance space between adjacent transporting rotary bodies, for vertical movement therethrough, and arranged on the same plane for simply being lifted up and down for loading and unloading the plate form body. Therefore, the storage means can be arranged within an installation region of the transporting passage portion. Also, necessary length of the transporting passage portion is merely two or three times that of the plate form body. Accordingly, the storage means can be installed in a relay transporting passage portion arranged between two transporting lines arranged in parallel relationship to facilitate installation. Furthermore, overall construction of the overall apparatus can be quite simple and in expensive.

Furthermore, when storing of the plate form bodies in the storage means is unnecessary, the plate form bodies can be transported irrespective of presence of two storage means. Upon occurrence of abnormality, in which the plate form bodies cannot be fed into the downstream side transporting line, and thus the plate form body fed from the upstream side line is to be temporarily stored, the stored plate form bodies can be fed out to the downstream side transporting line in the same order as fed from the upstream side transporting line in first-in first-out manner to avoid problem that otherwise might be caused by disordering of the plate form bodies due to presence of temporarily storing means. Accordingly, when the transporting apparatus according to the present invention is installed in the manufacturing line of the plate form bodies, the temporary storage of the plate form bodies will not affect for management of manufacturing lots.

In the preferred construction, the string like members lifted up and down between through one clearance between adjacent transporting rotary bodies are extended between a pair of left and right side frames, the pair of left and right side frames are integrated by an upper side connection frame located above the transporting passage portion and a lower side connection frame located below the transporting passage portion, and a vertically driving means for driving the lower side connection frame up and down is provided below the transporting passage portion.

In the alternative, the string like members lifted up and down between through one clearance between adjacent transporting rotary bodies are extended between a pair of left and right side frames, the pair of left and right side frames are integrated by an upper side connection frame located above the transporting passage portion and a lower side connection frame located below the transporting passage portion, and a vertically driving means for driving the upper side connection frame up and down is provided above the transporting passage portion.

By implementing the present invention with the construction set forth above, the storage means can be constructed using the space above and/or below the transporting passage.

Particular construction and operation of the present invention will become apparent from the disclosure of the preferred embodiment given hereinafter with reference to the accompanying drawings.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

Figure 1A:
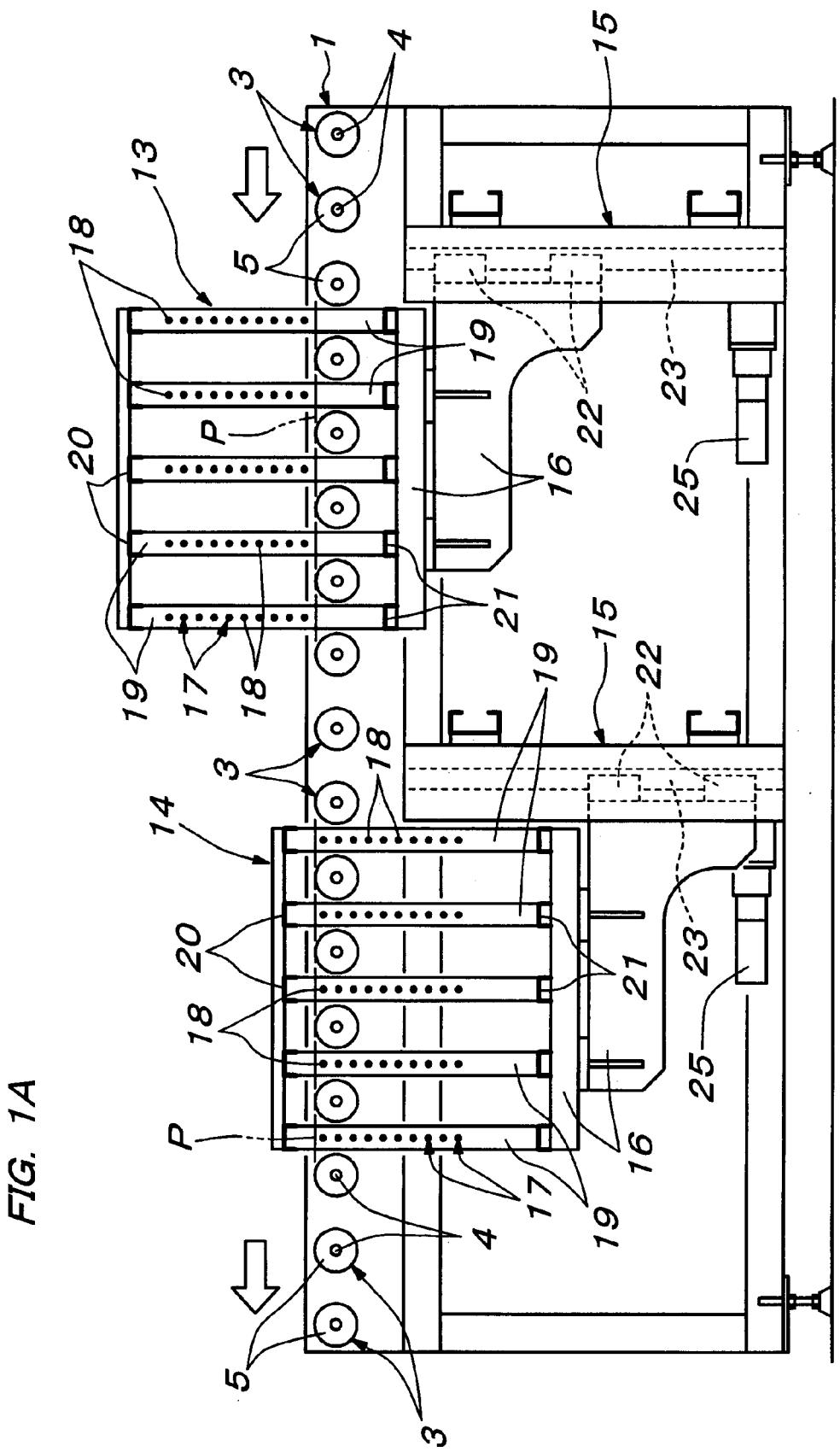
FIG. 1A is a partially and longitudinally sectioned side elevation of an overall construction of the preferred embodiment of a transporting apparatus according to the present invention.
Figure 1B:
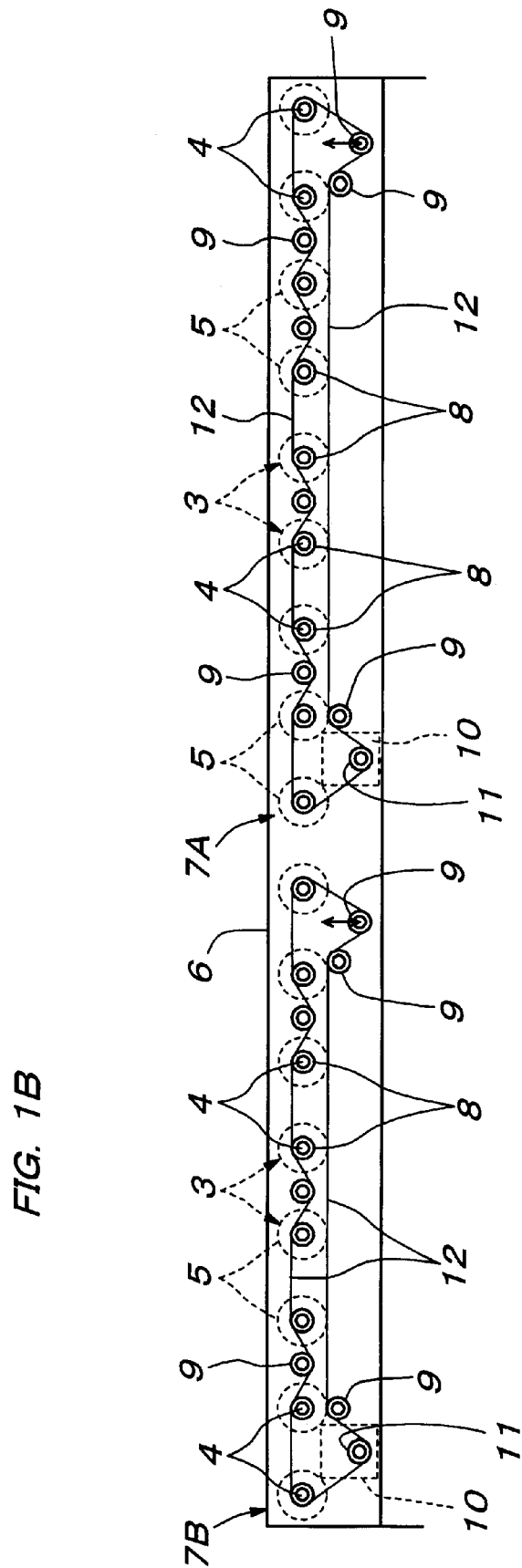
FIG. 1B is a side elevation showing driving means of a roller conveyer.
Figure 2:
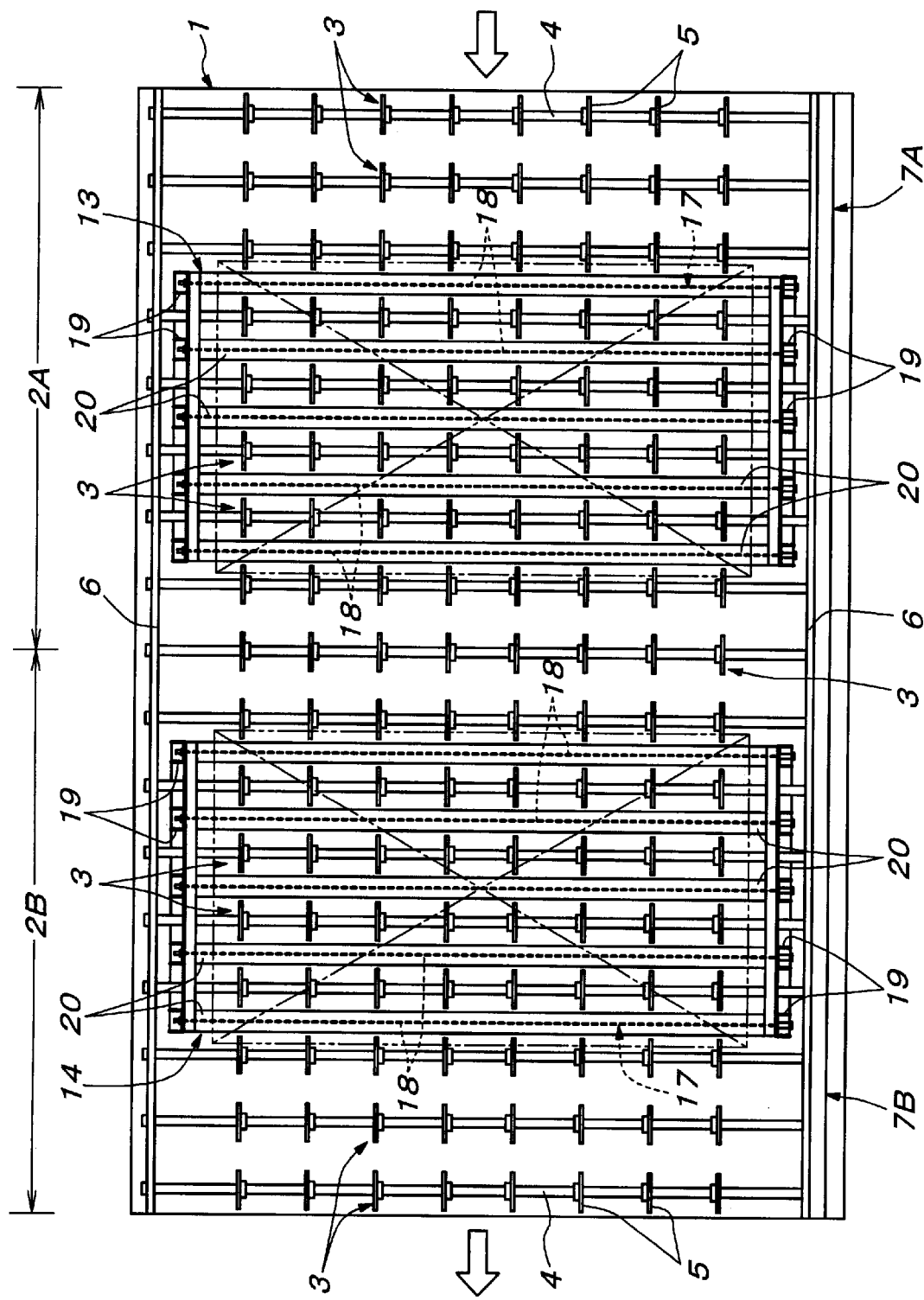
FIG. 2 is a plan view of the preferred embodiment of a transporting apparatus according to the present invention.
Figure 3:
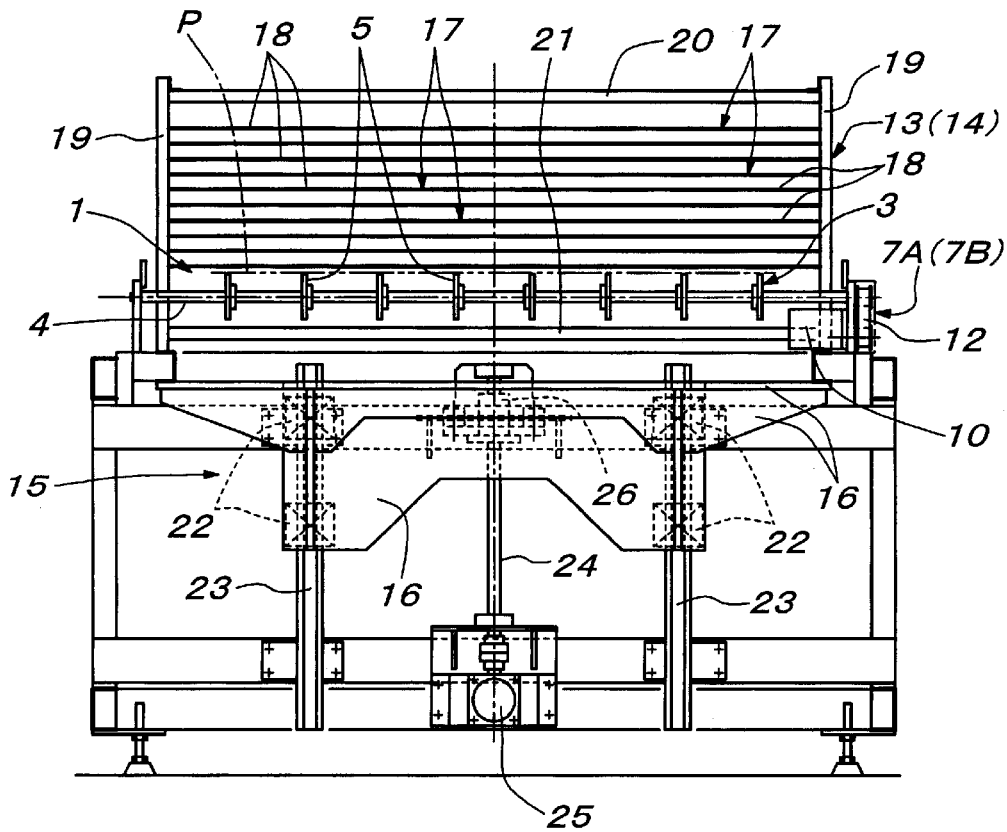
FIG. 3 is an end elevational view showing vertical driving means for an elevating platform of storage means according to the invention.
Figure 4:
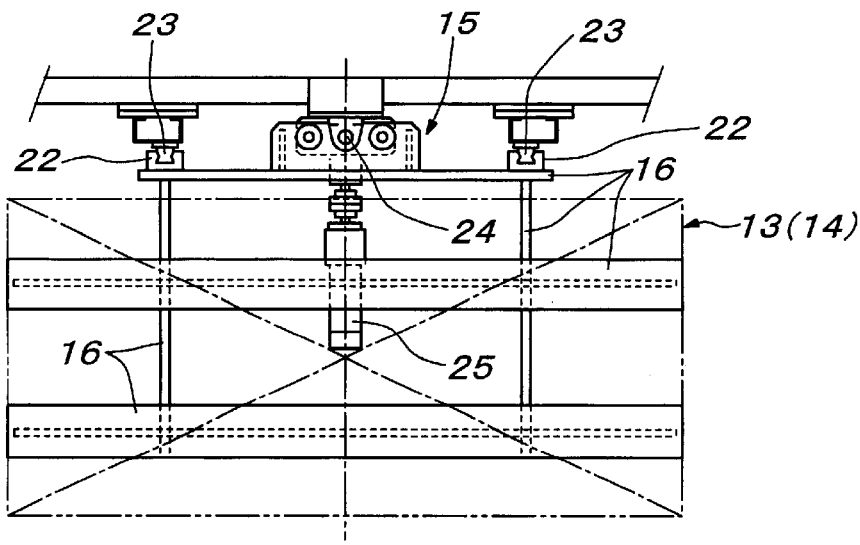
FIG. 4 is a plan view showing vertical driving means of FIG. 3.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Referring to FIGS. 1A to 4, the reference numeral 1 denotes a roller conveyer constructed with a front half conveyer portion 2A and a rear half conveyer 2B, in which a plurality of conveying rotary bodies 3 are arranged in alignment along a transporting direction, with a regular interval. Each transporting rotary body 3 is formed by mounting a plurality of discs on a rotary shaft 4 with a regular interval. Each rotary shaft 4 is horizontally supported between left and right side bearing plates 6. In each of the front half conveyer portion 2A and the rear half conveyer portion 2B, driving means 7A and 7B are provided for cooperatively driving respective transporting rotary bodies 3. Each driving means 7A and 7B is constructed with driven pulleys 8 mounted on one ends of respective rotary shafts 4, idle pulleys 9 rotatably arranged at desired positions, a driving pulley 11 mounted on a driving shaft of a motor 10, and a transmission belt 12 wrapped around the driven pulleys 8, the idle pulleys 9 and the driving pulley 11 for driving the transporting rotary bodies 3 in the same direction.

In the front half conveyer portion 2A and the rear half conveyer portion 2B of the roller conveyer 1, temporary storage means 13 and 14 are arranged for temporarily storing plate forms bodies. The temporary storage means 13 and 14 have identical construction. Each temporary storage means 13 and 14 has an elevating platform 16 lifted up and down within a lower space of the roller conveyer 1 driven by vertically driving means 15. On the elevating platform 16, plate form body supporting members 17 are vertically arranged with a plurality of stages (ten stages in the shown embodiment) with a given internal spacing so that the plate form body P may pass through a space between the vertically adjacent plate form body supporting members 17. The plate form body supporting member 17 is constructed by laterally stretching a plurality of string like members, such as wires or the like, in the same level, for vertical movement through a space between the transporting rotary bodies 3. It should be noted that, throughout the disclosure and claims, the word "string like members" is used for representing all elongated member suitable for supporting the plate form body, such as glass panel for plasma display and thus includes not only strings, such as wire, rope, cord or the like but also rigid elongated bars, strips and so on. Respective string like members 18 of respective stages of the plate form body supporting member 17 on the same vertical plane are stretched between a pair of left and right side frames 19 movable across the space between the adjacent transporting rotary bodies 3. A pair of left and right side frames 19 are integrated by an upper connecting frame 20 located above the roller conveyer 1 and a lower connecting frame 21 located below of the roller conveyer 1. The lower side frame 21 is mounted on the elevating platform 16.

The vertically driving means 15 of the elevating platform 16 is constructed with a pair of vertically extending guide rails 23 supporting the elevating platform 16 in cantilever fashion, a threaded rotary shaft 24 supported vertically between the vertically extending guide rails 23, a reversible motor 25 driving the threaded rotary shaft 24 in forward and reverse directions, and a female threaded body 26 threadedly engaging with the threaded rotary shaft 24 and fixed on the elevating base 16. Accordingly, by rotating the threaded rotary shaft 24 by the motor 25 in a forward direction, the elevating platform 16 is lifted upwardly. Conversely, by rotating the threaded rotary shaft 24 in reverse direction, the elevating platform 16 is lowered.

In each of storage means 13 and 14 constructed as set forth above, the plate form body supporting member 17 is formed with a plurality of the string like members 18 the number of which is large enough to stably support a possible maximum length of plate form body to be transported on the roller conveyer 1. A distance between a pair of left and right side frames 19 is set to be greater than a possible maximum width of the plate form body P to be transported on the roller conveyer 1. The elevating platform 16 is driven up and down between a lower limit position (see the storage means 14 of FIG. 1A) where the plate form body supporting body 17 at the uppermost level is located below a transporting level of the roller conveyer 1 and an upper limit position (see storage means 13 of FIG. 1A) where the plate form body supporting body 17 located at the lowermost level is located above the transporting level of the roller conveyer 1. It should be noted that when the elevating platform 16 is located at the lower limit position or the upper limit position, the plate form body P transported on the roller conveyer 1 may pass through the positions where the storage means 13 and 14 are provided.

Figure 7:
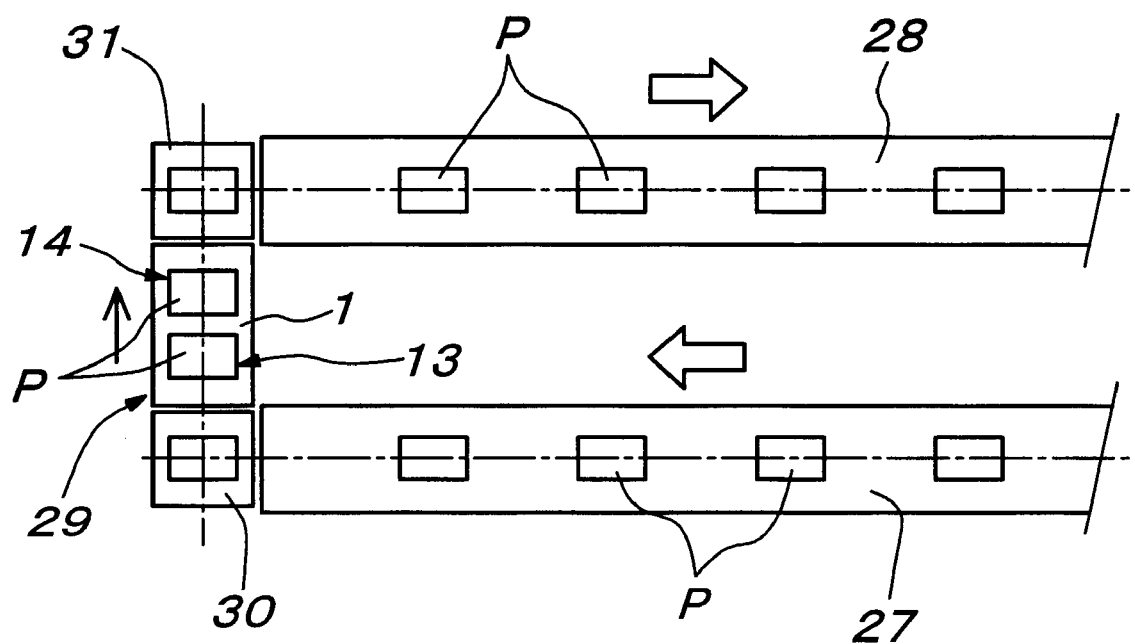
FIG. 7 is a general plan view showing one mode of use of the transporting apparatus according to the present invention.

By holding the elevating platforms of respective storage means 13 and 14 at the lower limit position or the upper limit position, and by rotatingly driving respective transporting rotary bodies 3 of the roller conveyer 1 by the driving means 7A and 7B, the plate form body P supported on respective transporting rotary bodies 3 is transported from the front half conveyer portion 2A to the rear half conveyer portion 2B. As shown in FIG. 7, the transporting apparatus constructed as set forth above, can be used as a relay transporting passage portion 29 between a first transporting line 27 and a second transporting line 28 arranged in parallel relationship with each other and having mutually opposite transporting direction. The reference numeral 30 denotes a plate form body transferring means for transferring the plate form body P from the first transporting line 27 to the relay transporting passage portion 29, 31 denotes plate form body transferring means for transferring the plate form body P from the relaying transporting passage portion 29 to the second transporting line 28. The plate form body transferring means 30 and 31 are arranged at upstream end and downstream end respectively of the transporting apparatus (roller conveyer 1) of the construction set forth above.

Thus, as set forth above, by holding the elevating platform 16 of each storage means 13 and 14 at the lower limit position or the upper limit position and rotatingly driving respective transporting rotary bodies 3 of the roller conveyer 1 by the driving means 7A and 7B, the plate form body P, fed in from the first transporting line 27 through the plate form body transferring means 30, is fed out to the plate form transferring means 31 via the front half conveyer portion 2A and the rear half conveyer portion 2B and then to the second transporting line 28 from the plate form body transferring means 31. Thus, the transporting apparatus (roller conveyer) constructed as set forth above can serve in a normal fashion as the relaying transporting passage portion 29.

Figure 5:
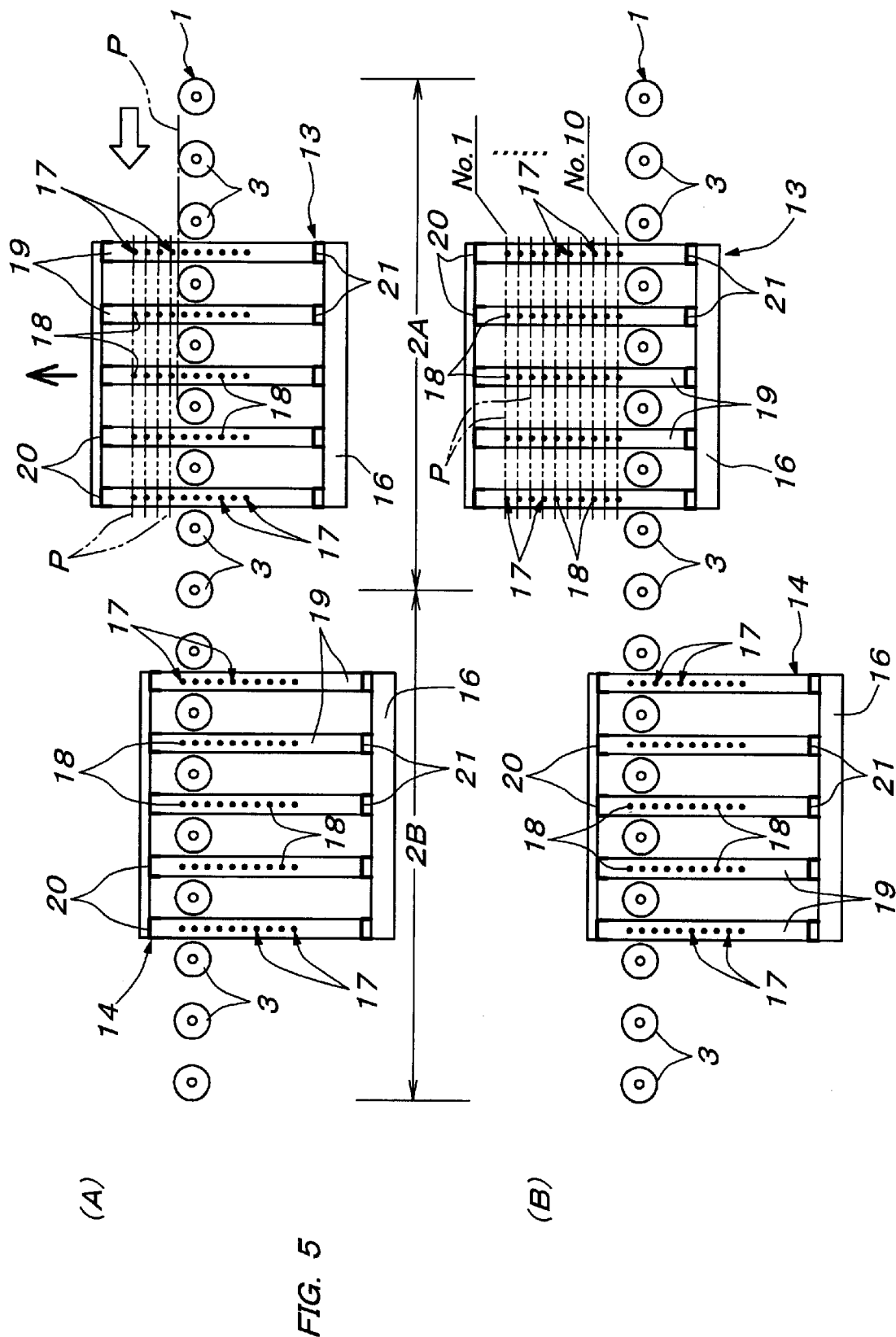
FIG. 5A is a general section showing a condition upon stacking plate form bodies in first storage means.
FIG. 5B is a general section showing a condition where stacking of the plate form bodies in the first storage is completed.

Upon occurrence of an event requiring interruption of feeding of the plate form body P to the second transporting line 28, the plate form body P fed from the first transporting line 27 to the roller conveyer is temporarily stored in the storage means 13 of the front half conveyer portion 2A in sequential order. Namely, as shown in FIG. 5A, by first lowering the elevating plate form 16 of the storage means 13 down to the lower limit position for placing the plate form body supporting member 17 at the uppermost position below the transporting level of the roller conveyer 1, when the front end of the first plate form body P to be temporarily stored reaches a predetermined position of the front half conveyer portion 2A (the position where the front end of the string like members 18 of the plate form body supporting member 17 of the storage means 13 and the front end portion of the plate form body overlap in plan view), respective transporting rotary bodies of the front half conveyer portion 2A is stopped to stop the plate form body P in place. The elevating platform 16 of the storage means 13 is then lifted up for one pitch (corresponding to vertical distance of the plate form body supporting member 17) to pick-up the first plate form body P to be temporarily stored by the plate form body supporting member 17 at the uppermost position. Subsequently, driving of the transporting rotary bodies 3 of the front half conveyer portion 2A is resumed to receive the subsequent plate form body P on the front half conveyer portion 2A. Subsequently, whenever the plate form bodies P reaches the predetermined position of the front half conveyer portion 2A and stops thereat, the elevating platform 16 of the storage means 13 is lifted up for one pitch to store the sequentially fed plate form bodies P in the storage means 13.

Figure 6:
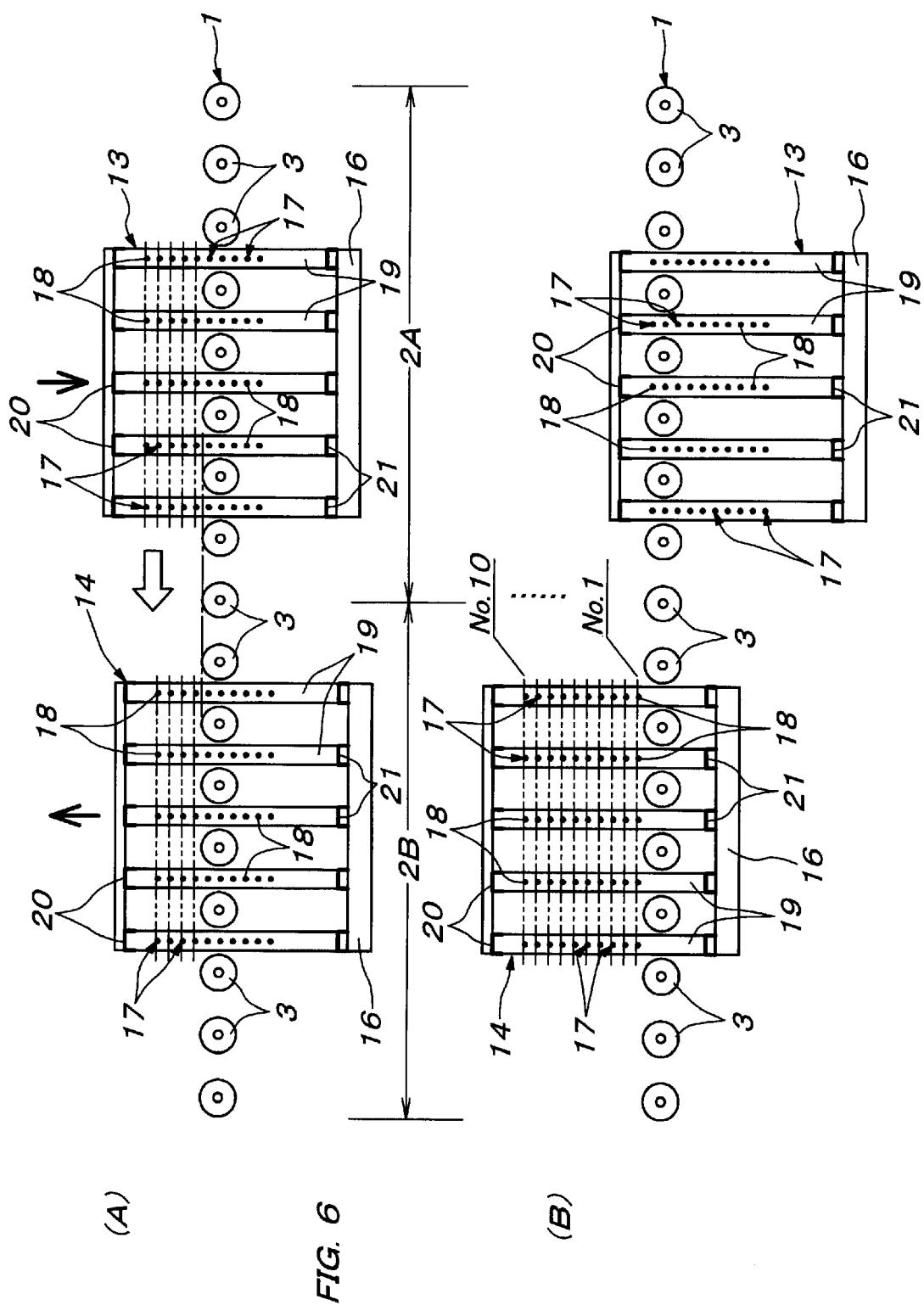
FIG. 6A is a general side elevation for explaining a condition where the plate form bodies are transferred from the first storage means to second storage means.
FIG. 6B is a general side elevation showing a condition where transferring of the plate form bodies to the second stage means is completed.

The plate form bodies P fed to the front half conveyer portion 2A as set forth above, are sequentially stored in the plate form body supporting members 17 from that located at the uppermost position. Therefore, the plate form bodies P are stored in the storage means 13 so that the last stored plate form body P is positioned at the lowermost position. When the storage means 13 becomes full (when ten plate form bodies P are stored in the shown embodiment) or when the second transporting line 28 is resumed in a condition for receiving the plate form body P, the elevating platform 16 of the storage means 13 is lowered for one pitch as shown in FIG. 6A in a condition where in-feeding of the plate form body to the roller conveyer 1 by the plate form body transferring means 30 to place the lowermost plate form body supported by the plate form body supporting member 17 on the front half conveyer portion 2A. Then, in a condition where the elevating platform 16 of the storage means 14 is placed at the lower limit position the transporting rotary bodies 3 of the front half conveyer 2A ands the transporting rotary bodies 3 of the rear half conveyer 2B are driven to transport the plate form body P returned from the storage means 13 to the front half conveyer portion 2A to the predetermined position on the rear half conveyer portion 2B (the position where the front end string like member 18 of the plate form body supporting member 17 and the front end portion of the plate form body P overlap in plan view) and stopped thereat.

Subsequently, similarly to the storage means 13, the elevating platform 16 of the storage means 14 is lifted up per one pitch to pick-up the plate form body P stopped on the rear half conveyer portion 2B by the plate form body supporting member 17 at the uppermost position of the storage means 14. By repeating unloading operation for returning the plate form bodies stored in the storage means 13 to the front half conveyer portion 2A, the plate form body transporting operation from the front half conveyer portion 2A to the rear half conveyer portion 2B by the roller conveyer 1 and plate form body picking up operation of the storage means 14, the plate form bodies P stored in the storage means 13 is transferred to the storage means 14.

The transferring operation from the storage means 13 to the storage means 14 is performed in such a manner that the plate form bodies P stored in the storage means 13 are sequentially taken out from the lower most plate form body to upper one and are sequentially stored in the storage means 14 in the plate form body supporting members 17 in order from the uppermost one to lower one. Therefore, the order of storage of the plate form bodies in the storage means 14 in vertical direction becomes opposite to the order of storage of the plate form bodies in the storage means 13 in vertical direction. Namely, in the storage means 14, after starting storing operation, the plate form bodies P are stacked in sequential order as fed into the storage means 13 from the lowermost level to upper levels.

As shown in FIG. 6B, when all of the plate form bodies P stored in the storage means 13 are transferred to the storage means 14, the elevating platform 16 of the storage means 14 is lowered for one pitch to place the plate form body P supported on the plate form body supporting member 17 at the lowermost position on the rear half conveyer portion 2B of the roller conveyer 1 for unloading operation. Then, the transporting rotary bodies 3 of the rear half conveyer portion 2B is driven to transport the unloaded plate form body P to the second transporting line 28. By repeating these unloading operation and transporting operation, all of the plate form bodies P stored in the storage means 14 may be fed out to the second transporting line 28. At this time, in the storage means 14, the plate form bodies are fed out in order from one in the lowermost level to those in upper levels. Thus, the plate form bodies P are fed out to the second transporting line 28 in the same order as being fed out from the first transporting line.

It should be noted that when a space for arranging the vertically driving means 15 for the storage means 13 and 14 cannot be obtained below the roller conveyer 1, the vertically driving means 15 may be arranged above the roller conveyer 1. On the other hand, if the plate form bodies P have sufficient stiffness, the string form bodies forming the plate form body supporting members 17 of the storage means 13 and 14 are not necessarily provided in all spaces between the transporting rotary bodies 3 in a region where the plate form body is to be supported, but can be provided in spaces between the transporting rotary bodies 3 with an appropriate interval.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A transporting apparatus for plate form bodies, comprising:

a transporting passage portion arranged in a transporting line for plate form bodies and including transporting rotary bodies arranged in alignment along a transporting direction with a given interval;

said transporting line having first and second portions positioned respectively (upstream and downstream of said transporting passage portion;

two temporary storing means provided in said transporting passage portion at two positions of upstream side and downstream side;

each of the temporary storing means including a plurality of plate form body supporting members arranged one above another with a set of string form bodies extending laterally and being positioned to be shifted vertically through a clearance between adjacent transporting rotary bodies;

all of the plate form body supporting members in each of the temporary storing means being supported by a framework which comprises a pair of left and right side frames extending vertically through the clearance between the adjacent transporting rotary bodies, a connection frame supporting said left and right side frames and vertically shiftable relative to said transporting passage portion; and two vertical driving means, one associated with each of the temporary storing means, to perform a loading operation of lifting up a plate form body stopped at a predetermined position on said transporting passage portion and thereafter perform an unloading operation of placing the plate form body from storage back onto the transporting passage portion;

said loading and unloading operations being performed first at the temporary storing means at the upstream side and thereafter again at the temporary storing means of the downstream side so that the temporarily stored plate form bodies are fed in the original order downstream from the transporting passage portion.

2. A transporting apparatus for plate form bodies as set forth in claim 1, wherein said connection frame includes an upper portion positioned above said transporting passage portion and a lower portion positioned below said transporting passage portion, and the two vertical driving means are positioned to shift vertically said connection frame of the plate form body supporting members.

3. A transporting apparatus for plate form bodies as set forth in claim 2, wherein said vertical driving means are positioned below said transporting passage portion.

* * * * *